US012472836B2

(12) United States Patent
Mauger et al.

(10) Patent No.: US 12,472,836 B2
(45) Date of Patent: Nov. 18, 2025

(54) MULTIPORT ENERGY ROUTING SYSTEMS

(71) Applicant: Georgia Tech Research Corporation, Atlanta, GA (US)

(72) Inventors: Mickael J. Mauger, Atlanta, GA (US); Rajendra Prasad Kandula, Atlanta, GA (US); Deepak M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/252,448

(22) PCT Filed: Nov. 10, 2021

(86) PCT No.: PCT/US2021/058810
§ 371 (c)(1),
(2) Date: May 10, 2023

(87) PCT Pub. No.: WO2022/103858
PCT Pub. Date: May 19, 2022

(65) Prior Publication Data
US 2023/0406126 A1    Dec. 21, 2023

Related U.S. Application Data

(60) Provisional application No. 63/112,043, filed on Nov. 10, 2020.

(51) Int. Cl.
*B60L 53/60*    (2019.01)
*B60L 53/30*    (2019.01)
(Continued)

(52) U.S. Cl.
CPC ............... *B60L 53/30* (2019.02); *B60L 53/51* (2019.02); *B60L 53/53* (2019.02); *B60L 53/60* (2019.02);
(Continued)

(58) Field of Classification Search
CPC .......... B60L 53/30; B60L 53/60; B60L 53/51; B60L 53/53; B60L 2210/10; B60L 2210/30; H02M 3/335
(Continued)

(56) References Cited

U.S. PATENT DOCUMENTS 10,391,870 B2     8/2019  Gotz et al.
2007/0007823 A1*  1/2007  Huang ...................... H02J 1/08
                                                  307/52

(Continued)

FOREIGN PATENT DOCUMENTS

CN    108233499 A    6/2018
CN    110167788 A    8/2019
(Continued)

OTHER PUBLICATIONS

International Search Report and Written Opinion from Application No. PCT/US2021/058810 dated Jan. 28, 2022.
(Continued)

*Primary Examiner* — Michael R. Fin
(74) *Attorney, Agent, or Firm* — TROUTMAN PEPPER LOCKE LLP; Ryan A. Schneider; Korbin M. Blunck

(57) ABSTRACT

An embodiment of the disclosure provides a flexible multiport energy routing system comprising a first port configured to connect to an AC grid, a plurality of second ports configured to connect to a plurality of devices, a step-down transformer, a power converter stack, and a third port. The step-down transformer can a high voltage side electrically coupled to the first port and a low voltage side. The power converter stack can comprise a plurality of power converter modules each having a first converter bridge connected to the low voltage side of the step-down transformer and a second converter bridge connected to one or more of the plurality of second ports. Each of the power converter
(Continued)

modules can have a converter transformer connected between the first and second converter bridges. The first and second converter bridges can bidirectionally manage AC and DC power flows between the first, second, and third ports.

20 Claims, 14 Drawing Sheets

(51) Int. Cl.
  *B60L 53/51* (2019.01)
  *B60L 53/53* (2019.01)
  *H02M 3/335* (2006.01)
(52) U.S. Cl.
  CPC ......... *H02M 3/335* (2013.01); *B60L 2210/10* (2013.01); *B60L 2210/30* (2013.01)
(58) Field of Classification Search
  USPC .......................................................... 307/31
  See application file for complete search history.

(56) References Cited

U.S. PATENT DOCUMENTS

| | | |
|---|---|---|
| 2011/0068626 A1 | 3/2011 | Terlizzi et al. |
| 2013/0257146 A1* | 10/2013 | Nojima ................... B60L 53/22 307/9.1 |
| 2015/0061569 A1 | 3/2015 | Alexander et al. |
| 2015/0165917 A1 | 6/2015 | Robers et al. |
| 2016/0176305 A1* | 6/2016 | James ....................... H02J 3/38 307/26 |
| 2018/0170193 A1* | 6/2018 | He ........................... H02J 50/10 |
| 2018/0229618 A1 | 8/2018 | Lee et al. |
| 2019/0077270 A1* | 3/2019 | Nieto ....................... B60L 53/53 |
| 2019/0280586 A1 | 9/2019 | Chen et al. |
| 2019/0319456 A1* | 10/2019 | Brathwaite ............... H02J 4/00 |
| 2019/0372465 A1 | 12/2019 | Xu et al. |

FOREIGN PATENT DOCUMENTS

| | | |
|---|---|---|
| JP | 2019213424 A | 12/2019 |
| WO | 2020/008985 A1 | 1/2020 |
| WO | WO-2021221626 A1 * | 4/2020 ............ H02M 1/007 |

OTHER PUBLICATIONS

Extended European Search Report from Application No. EP 21892743.2 dated Sep. 24, 2024.

Mauger, et al., "A Multiport DC Transformer to Enable Flexible Scalable DC as a Service," Oct. 10, 2021 IEEE Energy Conversion Congress and Exposition pp. 1197-1204.

Notice of Reasons for Refusal in related Japanese Patent Application No. 2023-527381, mailed Sep. 26, 2025 (and machine translation of same) (14 pages).

* cited by examiner

Case I: Truck fast-charging

Case II: Multiple EVs charging

Case III: Truck fast-charging + Grid support with PV and battery

Case V: Grid forming operation with PV and battery + Vehicle-to-Grid functionality

MULTIPORT ENERGY ROUTING SYSTEMS

CROSS-REFERENCE TO RELATED APPLICATIONS

This application claims the benefit of U.S. Provisional Application Ser. No. 63/112,043, filed on 10 Nov. 2020, which is incorporated herein by reference in its entirety as if fully set forth below.

FIELD OF THE DISCLOSURE

The various embodiments of the present disclosure relate generally to electrical energy systems, and more particularly to multiport energy routing systems and methods of their operation.

BACKGROUND

The typical utility power transformer converts high voltage AC power at a medium voltage of 13-34 kV to an AC voltage of 120-480 volts AC (or about 575 volts in Canada) for use by end customers. Transformers require an AC voltage to operate, and are unable to similarly process DC power. As a result, utilities have been traditionally limited to supplying "standard" AC voltages to their customers, who then routed (and conditioned if needed) the electricity before they used it in devices such as motors, lighting, rectifiers, and motor drives. The transformers provide protection against lightning strikes on the grid as well as protection against faults and ensure safe delivery of power to the end load. Conventional transformers, themselves, are not controllable in any way, and can source very high currents under fault conditions, requiring special protective devices—both at the medium voltage level (typically fuses or breakers), as well as at the low voltage level. Because the needs of individual customers vary widely, low-voltage safety practices were achieved through compliance with the National Electric Code (NEC) and by the Underwriters Laboratory (UL).

Over the last 100 years, power has generally been consumed as AC power and the practices described above became the norm. As the utility jurisdiction stopped at the "point of common coupling" (PCC) at the electrical meter, and as there were no control devices between the meter and the transformer, all protection gear on the customer side of the meter had to be designed for the unique conditions at the specific site, requiring a high level of design customization and cost to ensure that the system was safe under all corner cases in terms of operating and fault conditions.

The last few decades, however, have seen explosive growth of new loads and sources that intrinsically consume or generate DC power, respectively. These new load/sources include photovoltaic arrays, battery energy storage, data centers, DC fast charging of electric transportation, and hydrogen generation using electrolysis. Deployment of these new loads/sources is expected to exceed 100's of gigawatts/year, with individual installations reaching 0.1 to more than 100 MW capacity. This class of DC loads/sources represent perhaps over 90% of new load growth that utilities are seeing—and the only way to serve these loads today is using the paradigm for serving AC loads.

FIG. 1 shows a one-line diagram for a conventional typical DC fast charging station serving multiple vehicles. The elements include a transformer, a breaker that can interrupt fault currents that may occur at that location, and a rectifier that provides high power factor and generates an intermediate DC bus voltage, which is supplied to additional power converters that generate galvanically isolated DC power needed to charge a single vehicle. It is desirable for each vehicle to have a charger with isolation for safety and with independent controls that the vehicle manages. This structure can also allow for integration of additional inputs/outputs—e.g. PV panels and batteries to reduce demand charges. In these cases, the power needs to sometimes flow bidirectionally, requiring different types of converters that can handle bidirectional power flow, with isolation either at the converter level, as shown in the conventional implementation in FIG. 2, or with isolation at the system level through multiple line-frequency transformers, as shown in the conventional implementation in FIG. 3.

Although multiport operation is desired, each of the conventional converters is designed to operate as a single port converter with specific functionalities (unidirectional/bi-directional, isolated/non-isolated, DC/DC or AC/DC conversion, etc.), requiring extensive coordination between converters. Each converter is designed with protection gear, and has to also be coordinated at the system level—for transients as well as for steady state operations. Similar use cases can be created for PV, energy storage, and the other high power DC applications. As can be seen, this is a very complex system, with layers of protection, often to coordinate equipment from different vendors. Professional engineers are used to certify that the system conforms to protection and national codes. This is a very cumbersome and expensive process with a high level of customization and can take a very long time for project completion.

Further, as utilities have traditionally not supplied anything other than AC power, they have been unable to add any value to their customers who desire DC power. In addition, because control of the DC source/load is done by an entity different from the utility, it has been very challenging to coordinate with grid operations, requiring high levels of reserve to manage unexpected contingencies. This results in significantly high cost to end users and to society. Given that the deployment of these new DC loads/sources is often linked to the growth of renewable energy resources, this also has a slowing effect on the rate of growth. If we look at the fundamentals of electricity power delivery, there is no restriction on utilities delivering DC power—it has simply not been possible to have a "universal" transformer structure that is multiport, bidirectional, fully protected, flexible and economical, had a wide scale of deployment, and is capable of providing AC and DC power. Electric utilities have long recognized the value that "DC as a Service" could provide, but have been unable to realize an economically and technically viable solution.

Accordingly, there is a desire for improved energy routing systems capable of connecting to both the AC utility grid and multiple other AC/DC loads and sources for routing energy among the various loads/sources.

BRIEF SUMMARY

The present disclosure relates to multiport energy routing systems and methods of their operation. An exemplary embodiment of the present disclosure provides flexible multiport energy routing system comprising a first port, a plurality of second ports, a step-down transformer, a power converter stack, and a third port. The first port can be configured to be electrically connected to an AC utility grid. The plurality of second ports can be configured to allow electrical power to flow between the multiport energy routing system and a plurality of devices electrically connected to the plurality of second ports. The step-down transformer can have a high voltage side and a low voltage side. The high voltage side can be electrically coupled to the first port. The power converter stack can comprise a plurality of power converter modules. Each of the plurality of power converter modules can comprise a first converter bridge, a second converter bridge, and a power converter transformer. The power converter transformer can have a first side electrically coupled to the first converter bridge and a second side electrically coupled to the second converter bridge. The first converter bridge can be electrically coupled to the low voltage side of the step-down transformer. The second converter bridge can be electrically coupled to one or more of the plurality of second ports. The third port can be electrically coupled to one of one or more of the first converter bridges and one or more of the second converter bridges of the plurality of power converter modules. The first and second converter bridges can be configured to bidirectionally manage AC and DC power flows between the first, second, and third ports.

In any of the embodiments disclosed herein, the power converter stack can further comprise a control circuit configured to route power between one or more of the second converter bridges and a predetermined set of devices in the plurality of devices.

In any of the embodiments disclosed herein, the control circuit can comprise at least one multiplexer.

In any of the embodiments disclosed herein, the control circuit can comprise at least one switch and/or relay.

In any of the embodiments disclosed herein, the third port can be electrically coupled to the first converter bridge of one or more of the plurality of power converter modules. The third port can be configured to allow electrical power to be transferred between an AC/DC source/load connected to the third port and another AC/DC source/load connected to another port of the multiport energy system.

In any of the embodiments disclosed herein, the third port can be a dynamic port.

In any of the embodiments disclosed herein, the system can further comprise a fourth port electrically coupled to the second bridge of one or more of the plurality of power converter modules. The fourth port can be configured to allow electrical power to be transferred between an AC/DC source/load connected to the fourth port and another AC/DC source/load connected to another port of the multiport energy system.

In any of the embodiments disclosed herein, the fourth port can be a dynamic port.

In any of the embodiments disclosed herein, a ground of the fourth port can be electrically independent of a ground of the step-down transformer.

In any of the embodiments disclosed herein, the plurality of second ports can be dynamic ports configured to deliver AC or DC electrical power to and/or receive AC or DC electrical energy from the plurality of devices.

In any of the embodiments disclosed herein, the plurality of second ports can be configured to allow electrical power to flow between the multiport energy routing system and a first device in the plurality of devices at a first maximum electrical power level and to allow electrical power to flow between the multiport energy routing system and a second device in the plurality of devices at a second maximum electrical power level greater than the first electrical power level.

In any of the embodiments disclosed herein, each of the plurality of power converter modules can be a soft-switching solid-state transformer converter.

In any of the embodiments disclosed herein, the first port, the plurality of second ports, the third port, the step-down transformer, and the power converter stack can be integrated in a housing.

In any of the embodiments disclosed herein, the system can further comprise a controller configured to select a device in the plurality of devices electrically connected to the plurality of second dynamic ports to which electrical energy from the multiport energy routing system will be delivered at a predetermined time.

In any of the embodiments disclosed herein, the controller can comprise one or more multiplexers.

In any of the embodiments disclosed herein, the plurality of devices electrically connected to the plurality of second ports can comprise an electric vehicle charging station.

In any of the embodiments disclosed herein, the plurality of devices electrically connected to the plurality of second ports can comprise photovoltaic module.

In any of the embodiments disclosed herein, the plurality of devices electrically connected to the plurality of second ports can comprise a battery.

In any of the embodiments disclosed herein, the plurality of devices electrically connected to the plurality of second ports can comprise an electrolyzer.

In any of the embodiments disclosed herein, the multiport energy routing system can be configurable between N+1 independent grounding schemes, wherein N is the number of power converter modules in the plurality of power converter modules.

Another embodiment of the present disclosure provides a multiport energy routing system comprising a static AC port, a plurality of DC ports, a step-down transformer, a power converter stack, and one or more multiplexers. The static AC port can be configured to be electrically connected to an AC utility grid. The plurality of DC ports can be configured to allow DC power to flow between the multiport energy routing system and a plurality of devices electrically connected to the plurality of DC ports. The step-down transformer can have a high voltage side and a low voltage side. The high voltage side can be electrically coupled to the static AC port. The power converter stack can comprise a plurality of power converter modules. Each of the plurality of power converters can comprise a first converter bridge, a power converter transformer, and a second converter bridge. The first converter bridge can be electrically coupled to the low voltage side of the step-down transformer. The one or more multiplexers can be configured to receive electrical DC power from the second converter bridges of the plurality of power converter modules and deliver DC power to one or more selected devices in the plurality of devices electrically connected to the dynamic DC port.

In any of the embodiments disclosed herein, the one or more multiplexers can be further configured to receive electrical DC power one or more selected devices in the plurality of devices electrically connected to the dynamic DC port and deliver DC power to the second converter bridges of the plurality of power converters.

In any of the embodiments disclosed herein, the power converter transformer can comprise a first side electrically connected to the first converter bridge of the respective power converter module and a second side electrically connected to the second converter bridge of the respective power converter module.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
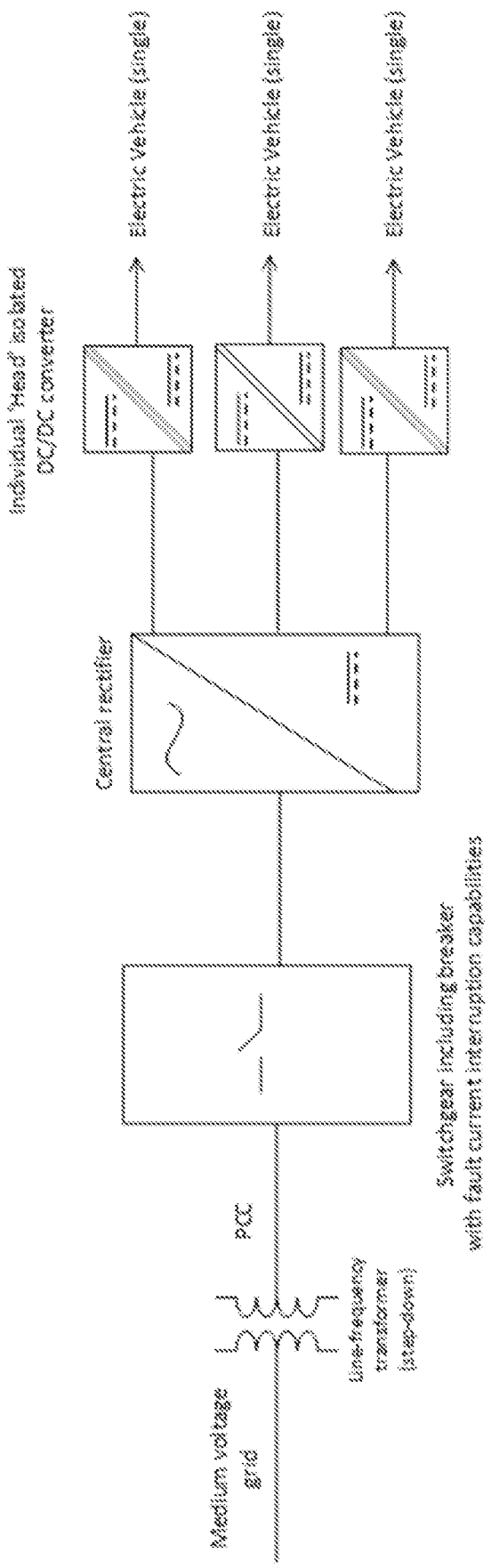
FIG. 1 provides a one-line diagram for a conventional DC fast charging station serving multiple vehicles.

As discussed above, conventional utility transformers connecting to the AC utility grid are incapable of directly connecting to DC load/sources. Accordingly, the present disclosure provides novel multiport energy routing systems for routing electrical power among the AC utility grid and multiple AC and/or DC sources/loads connected to the system. The disclosed systems can realize a unique flexible, scalable, and dynamically reconfigurable solution to deliver AC and/or DC as a Service, promising a high level of interoperability, flexibility, and integration to reduce cost and complexity compared to traditional concepts and solutions.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Some embodiments of the disclosed multiport energy routing system disclosed herein make use of soft-switching solid-state transformer (S4T) converters previously invented by the inventors. S4T converters are disclosed in U.S. patent Ser. No. 10/491,098 and PCT Patent Publication No. WO2020023471, which are incorporated by reference in their entireties as if fully set forth below. The present disclosure, however, is not limited to the use of S4T converters. Rather, various embodiments of the present disclosure can employ many different power converters known in the art. The S4T topology does have inherent properties of multiport operation, soft switching, current source characteristics and galvanic isolation. These properties make the S4T solution very attractive for applications such as PV farms with integrated energy storage. One can operate a S4T with a 3-phase AC port on one side of the high-frequency (HF) transformer, and two DC ports for PV and battery on the other side. The number of ports can be extended as needed, provided the maximum energy transferred over a switching cycle remains bounded.

The present disclosure describes how to implement large standardized AC and DC systems that still provide flexibility to target varied end-use AC applications as well as emerging DC applications, including PV, battery, hydrogen electrolysis, EV fast charging and other applications using a concept where the utility (or equivalent private provider) provides a safe, isolated and controlled DC voltage/current as needed to interface with the target DC loads/sources. Generally, the entire multiport energy routing system can include a standard medium voltage step-down transformer with upstream protection against fault currents and lightning strikes, which is integrated (either in the factory or on site) with an appropriately interconnected multiport power converter stack. The multiport converter can be configured dynamically via software to support multiple AC and/or DC ports with arbitrary directions of power flow, while ensuring that safety and isolation requirements are met.

The S4T topology is inherently modular and can provide a single-stage conversion between AC/DC sources and loads with high-frequency isolation. As an isolated current source converter, the topology lends itself to virtually unlimited paralleling to scale in power as needed without circulating current issues. The present disclosure builds upon this intrinsic modularity and flexibility to add dedicated hardware and techniques to the basic S4T technology to realize a truly flexible, integrated, and self-protected multiport energy routing system providing multiple, independently controlled, and isolated dynamic AC and/or DC ports with dynamic capacity adjustment.

Figure 4:
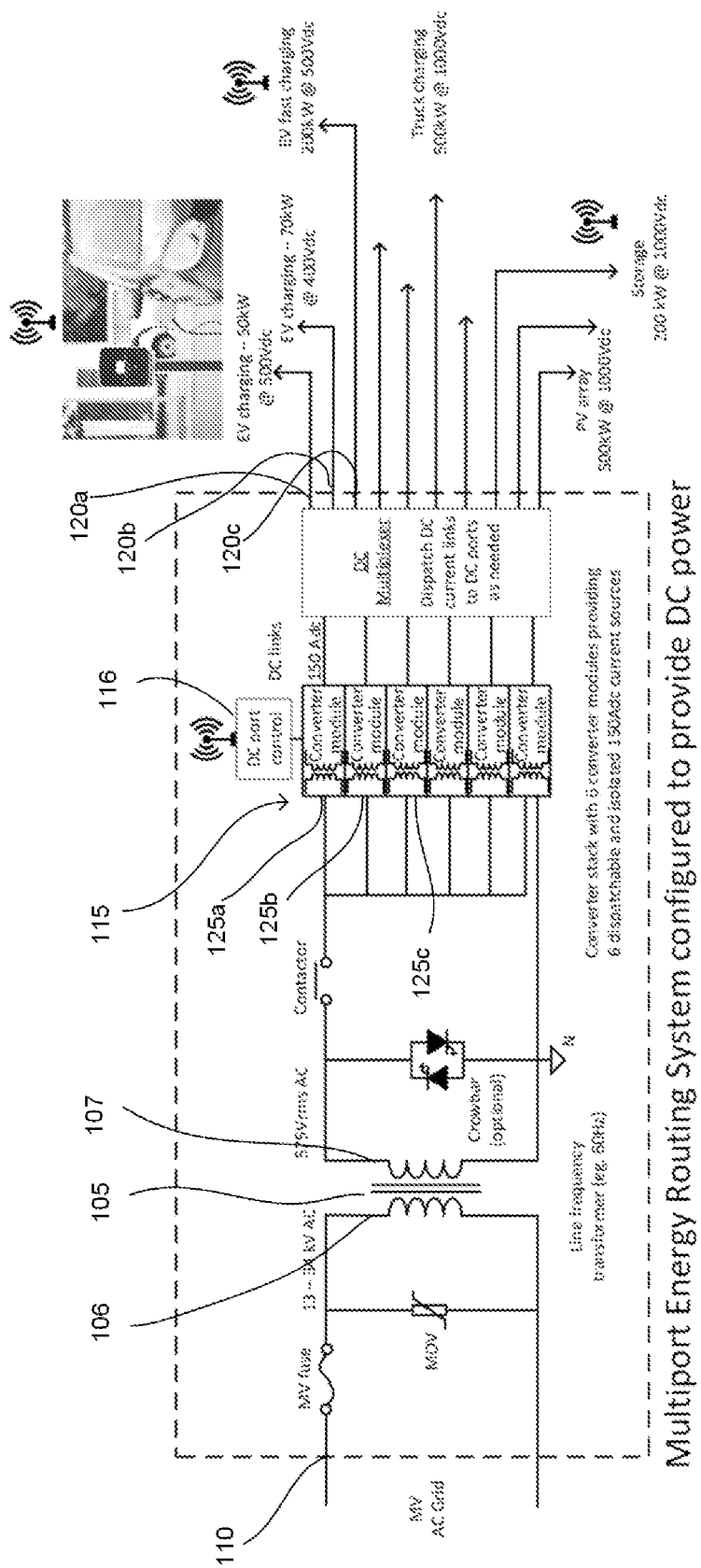
FIG. 4 provides a schematic of a multiport energy routing system, in accordance with an exemplary embodiment of the present disclosure.

As shown in FIG. 4, an exemplary embodiment of the present disclosure provides a multiport energy routing system (MERS). The MERS can comprise a first port 110 configured to be electrically connected to a medium-voltage AC utility grid. The MERS can further comprise a plurality of second ports 120a, 120b, 120c configured to allow energy to flow between the MERS and a plurality of devices electrically connected to the plurality of second ports. The MERS can comprise an integrated line frequency step-down transformer 105 (60 Hz, 50 Hz) providing the step-down and basic-insulation-level (BIL) management functionality required, and a first layer of galvanic isolation. The step-down transformer 105 can have a high voltage side 106 connected to the first port 110. The low voltage side 107 of the step-down transformer 105, typically 480-575 Vrms, is then fed into a power converter stack 115. The power converter stack 115 can comprise a plurality of power converter modules 125a, 125b, 125c (e.g., S4T converters), which can be in a parallel configuration. The converter modules 125a, 125b, 125c can have an intrinsic limitation on the maximum current that can be sourced or sinked, including under fault conditions, allowing for a great simplification of the grid-facing protection mechanism. This can be exploited in the disclosed MERS where the protection strategy relies on the line frequency step-down transformer 105 for isolation coordination and the connection to the MV AC grid can be made through a simple MV fuse or fusible disconnect, and a set of overvoltage protection devices, such as MOVs. If needed, a crowbar, comprising high current pulse withstanding devices such as a set of thyristors in anti-parallel configuration, can be added to the low-voltage secondary side 107 of the line frequency step-down transformer 105 and triggered under fault conditions to help activate the MV fuse protection (open the fuse). The power converter stack 115 can be connected to the low voltage side 107 of the transformer 105 through a contactor (3-pole or 4-pole) to isolate the stack from the grid when not in operation. The protection hardware and circuit described above can be integrated to the step-down transformer 105 within the MERS so as to provide a fully protected device that can directly interface with the MV gird. As compared to solution with direct grid-connected power electronics, the MERS can eliminate the need for external high interrupt capacity switchgear and complex protection coordination and BIL management strategies, simplifying installation and reducing cost.

Each of the power converter modules within the MERS can be identical for ease of manufacturability, and offer at least one controlled AC and/or DC output, isolated from the AC side through high-frequency galvanic isolation, thus providing a second discrete and distributed layer of isolation within the MERS. The power converter modules 125a, 125b, 125c can be capable of single-stage AC/DC conversion, eliminating the need for further DC converters at the DC ports 120a, 120b, 120c. This is particularly advantageous in DC fast charging for EVs where the individual charging "head" controlling the power flow at the EV connection point and providing isolation, can be completely eliminated. The number of power converter modules per MERS can be adjusted to meet the target installation capacity, for a true modular construction.

Figure 5A:
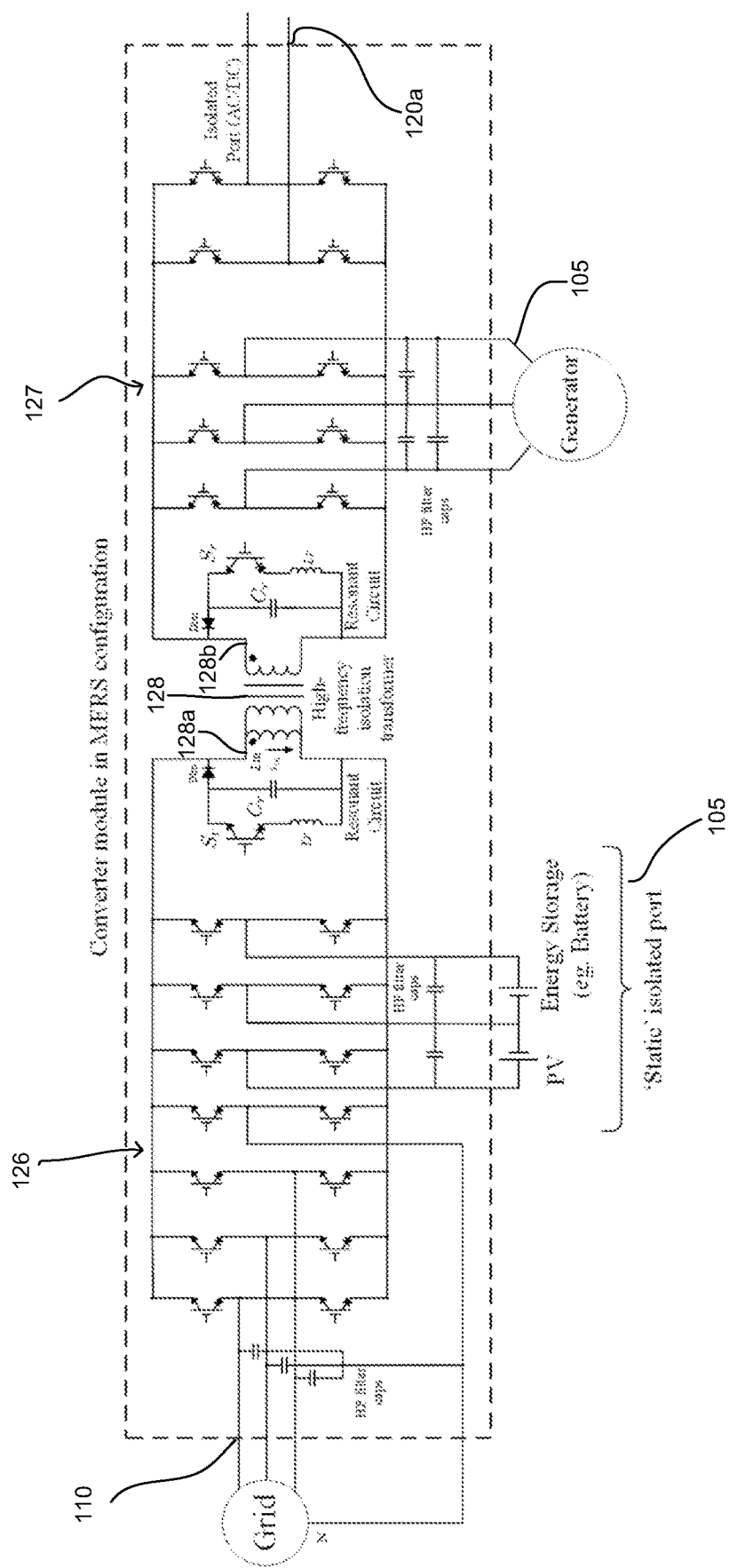
FIG. 5A provides a schematic of a power converter module, in accordance with an exemplary embodiment of the present disclosure.

An exemplary power converter module is shown in FIG. 5A. As shown in FIG. 5A, each power converter module 125a, 125b, 125c can comprise a first converter bridge 126, a second converter bridge 127, and a power converter transformer 128. The power converter transformer 128 can have a first side 128a electrically coupled to the first converter bridge 126 and a second side 128b electrically coupled to the second converter bridge 127. The first converter bridge 126 can be further electrically coupled to the low voltage side 107 of the step-down transformer 105. The second converter bridge 127 can be further electrically coupled to the plurality of second ports 120a, 120b, 120c (e.g., via a control circuit 116, such as a multiplexer or combinations of switches and/or relays). Each of the first and second converter bridges 126, 127 can have multiple connection points, each capable of providing AC or DC power. For purposes of illustration only, step-down transformers are not shown in FIGS. 5A-B, but in various embodiments of the present disclosure, the first converter bridges of the power converter modules can be electrically connected to the low-voltage side of a step-down transformer.

For example, to further leverage the modularity of the power converter modules, an integrated multiplexer structure can be used to interface the power converter modules to the multiple dynamic ports offered by the MERS, as shown in FIG. 4. The multiplexer 140 can be integrated within the power converter modules 125a, 125b, 125c to select the port 120a, 120b, 120c the module is connected to as detailed in FIG. 5B, with, for example, a 1-to-4 multiplexer per module in the exemplary implementation shown. There is no fault current capacity or inrush current issues in the converter modules 125a, 125b, 125c, so that the multiplexer 140 can be realized with simple contactors, sized to carry the load current, without the need for fault current withstanding and interruption capabilities. The multiplexer 140 allows for the connection of the controlled output of the converter modules 125a, 125b, 125c to a fixed subset of dynamic ports determined from a tradeoff between the target level of flexibility and multiplexing cost. All dynamic ports thus formed can be capable of AC or DC bi-directional power conversion. For instance, in the implementation based on the converter module shown in FIG. 5B, and detailed in FIG. 6, each converter module can connect to four distinct ports—first port 110, second ports 120a, 120b, 120c, third port 130, and fourth port 135—and the MERS can dispatch each individual converter module to a total of say ten "dynamic" ports, that could be used as charging portal in an electric vehicle charging station, or connect to multiple PV strings, battery cells, Electrolyze cells, AC motors, etc. These "dynamic" ports could be of different ratings—say 900 Amperes for truck and bus charging, and 450 Amperes for very fast charging, as well as additional ports at 300 and 150 Amperes. It can be desirable to have a larger number of dynamic as that provides flexibility to dynamically reconfigure the loads/sources that are being serviced at a given instant, and the maximum power flow that can be sustained. This compares with conventional approaches, where individual sources and loads require a full rated and dedicated power converter with fixed maximum power flow capacity, possibly with isolation, making it expensive, bulky, and inflexible.

As used herein, the term "dynamic port" refers to an electrical connection in which the maximum available power flow through that port can be dynamically adjusted at any given time, such as by a control circuit, e.g., a multiplexer. For example, the power flow capacity of a "dynamic port" can be dynamically adjusted to maximize the MERS utilization factor. That is, if a device is connected to a particular dynamic port, the MERS can select, e.g., using a multiplexer or other controller or control circuit, the power flow capacity, or maximum allowable power flow through that port to/from the device. It is to be understood that the port capacity can be reduced to 0, i.e., the device connected to this dynamic port can effectively be dynamically disconnected from the MERS. As used herein, the term "static port" refers to an electrical connection in which the maximum available power flow through that port, or the port capacity, cannot be selected dynamically by the MERS. For example, the first port connected to the AC utility grid in FIG. 4 would be considered a static port because the MERS does not selectively control the power flow capacity, or maximum power flow allowed through the first port between the grid and the MERS. It is instead fixed to a set capacity during the design of the MERS system.

By avoiding the direct and permanent connection of converter modules to a given dynamic port, the power converter stack can be reconfigured dynamically to parallel the required number of converter modules per dynamic ports of the MERS to meet the individual voltage and power needs of the ports. This is possible without circulating current and while maintaining full galvanic isolation between all the dynamic ports at all-time. Considering the exemplary implementation shown in FIG. 6, all six converter modules can be connected at the same time to dynamic port "A" to realize a combined capacity of 900A. Two distinct sets of three converter modules can further be connected to port "B" and "C" to generate simultaneously two independently controlled and isolated ports with a capacity of 450A. The same principle can apply to port "D" through "H" where up to two converter modules can be connected in parallel to realize five independently controlled and isolated ports capable of delivering up to 300A. A single converter module can be dispatched to port "I" and "J" to further offer two 150A connection points. It is understood that not all ports can be powered at full capacity at the same time, yet this unique level of flexibility and dynamic reconfiguration allows for a better utilization of the installed converter modules capacity, and a better utilization of resources by dispatching the converter modules from the underutilized dynamic ports to the ports requiring more power.

At the stack level, a central controller 116 can gather the power and voltage needs of each of the dynamic ports through a communication link (radio, wired, etc.) and reconfigure the stack to dispatch the required number of converter modules per port using the multiplexer 140 or set of multiplexers. The controller 116 can be many different controllers or control circuits known in the art and can comprise one or more multiplexers, switches, relays, and combinations thereof. It should be highlighted that load switching may not be required under normal conditions, further simplifying the multiplexer design. The multiplexer can also manage the isolation needed for the individual dynamic ports, and can isolate the dynamic ports in case of fault.

Figure 2:
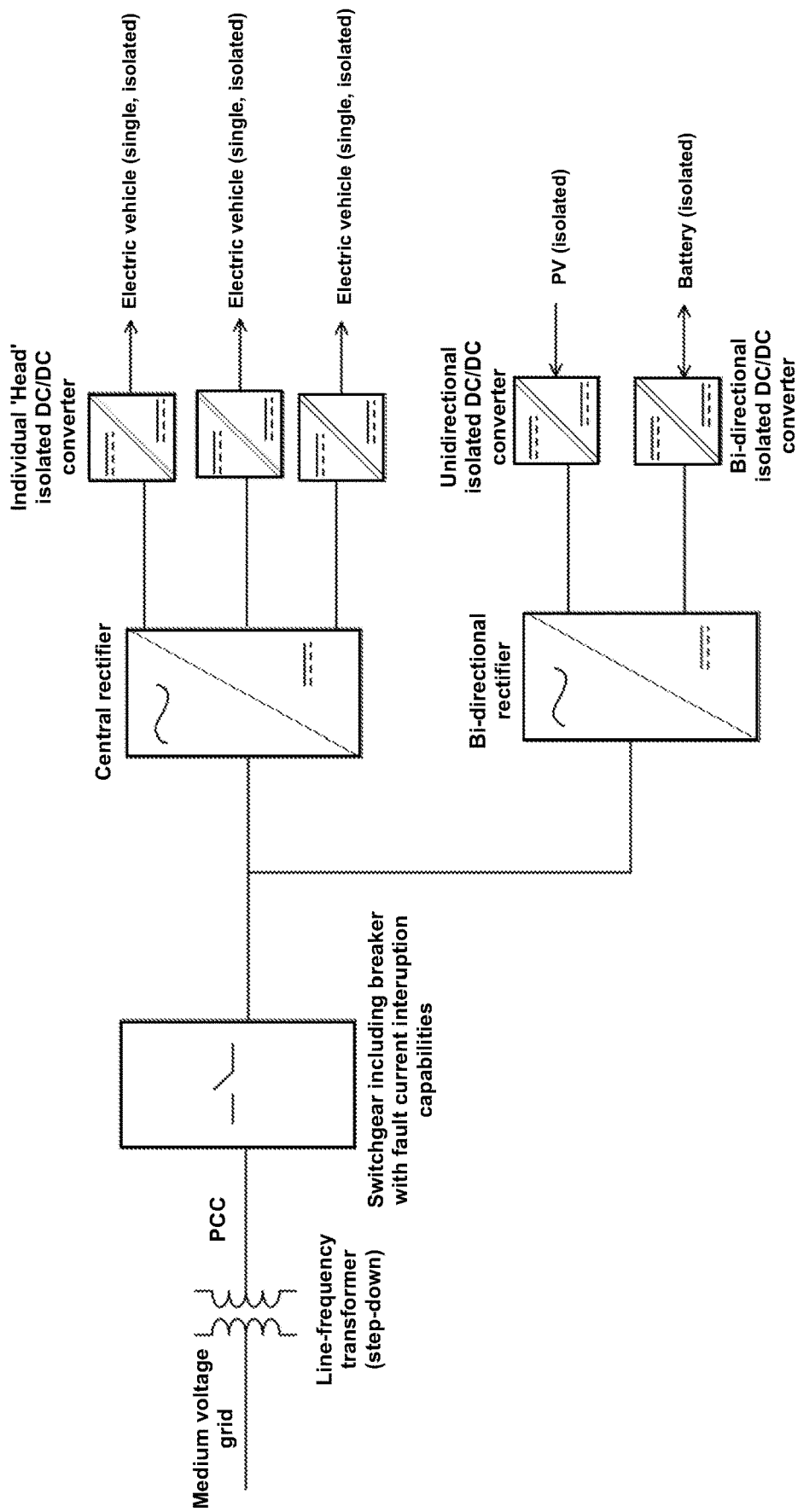
FIG. 2 provides a one-line diagram for a conventional DC fast charging station serving multiple vehicles with PV and battery storage integration using additional and dedicated isolated DC/DC converters and a bi-directional rectifier.
Figure 3:
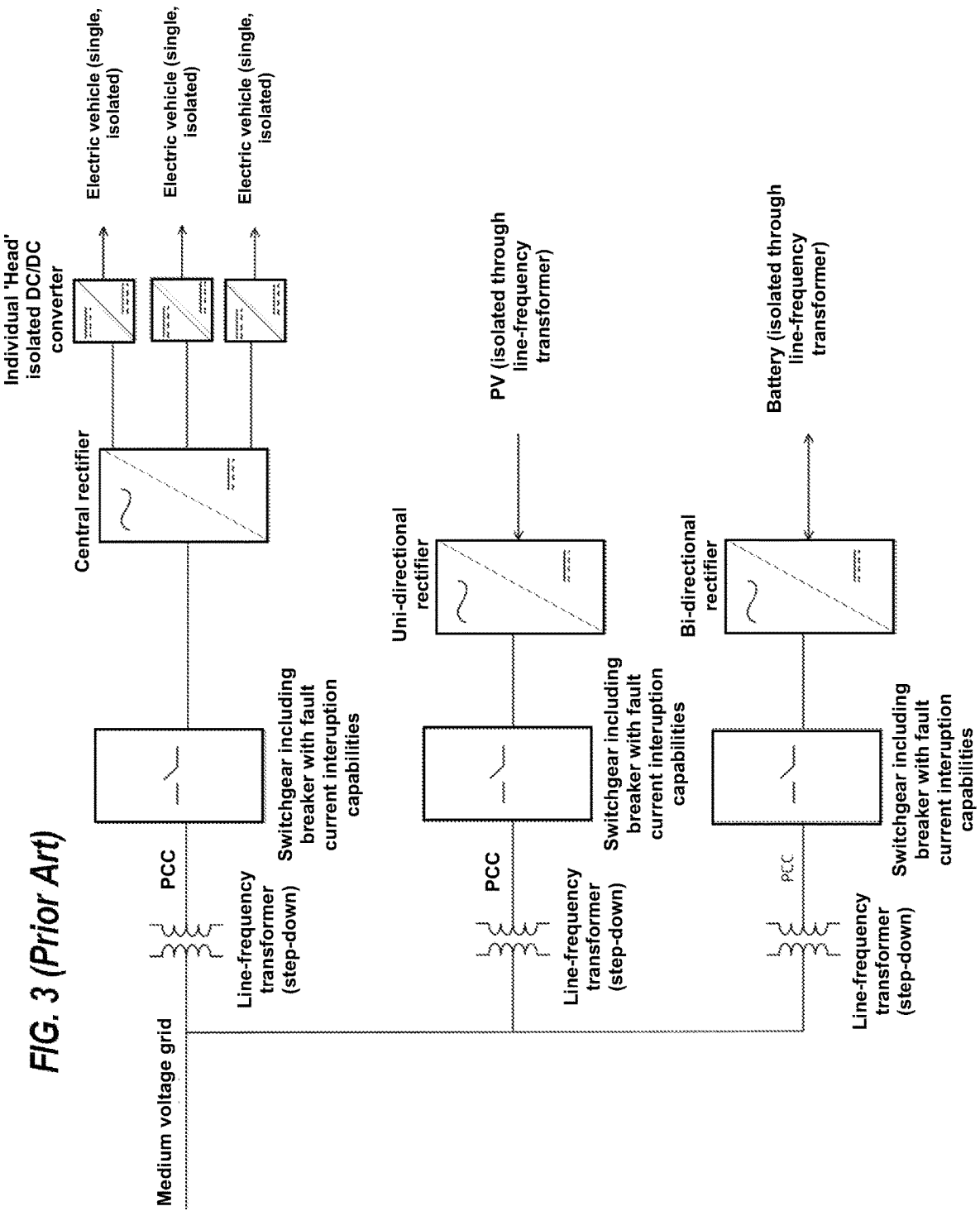
FIG. 3 provides a one-line diagram for a conventional DC fast charging station serving multiple vehicles with PV and battery storage integration using additional non-isolated and dedicated rectifiers and line-frequency transformers.
Figure 5B:
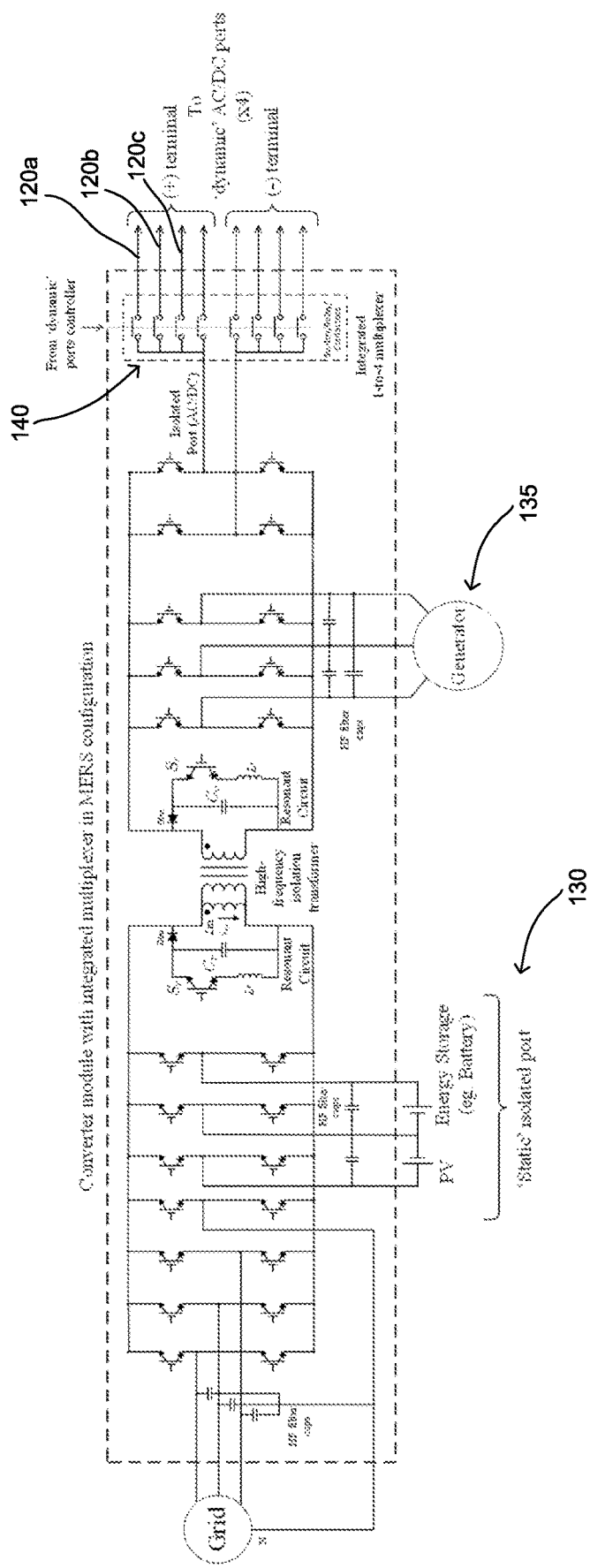
FIG. 5B provides a schematic of a power converter module with a multiplexer, in accordance with an exemplary embodiment of the present disclosure.
Figure 6:
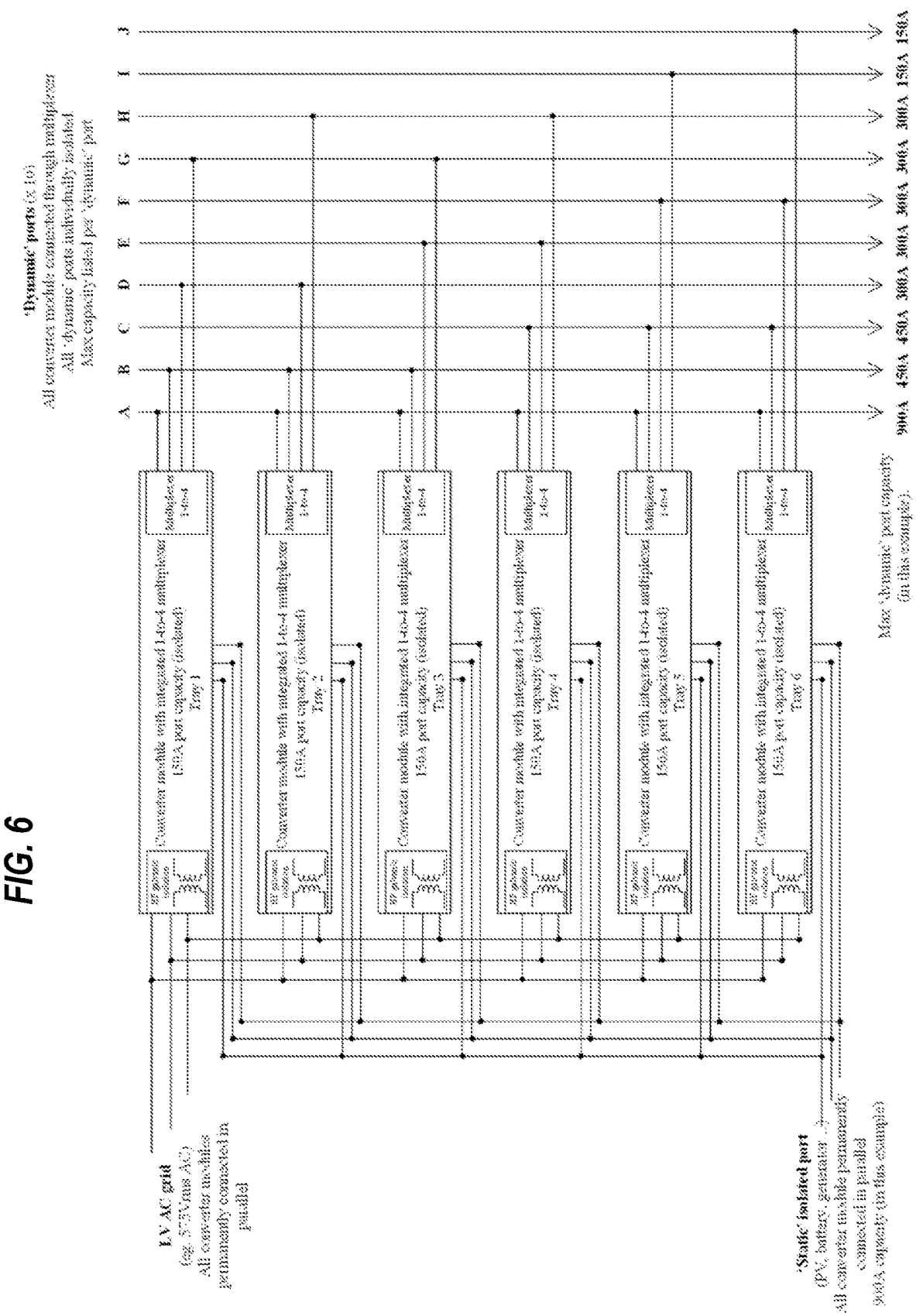
FIG. 6 provides a schematic of a multiport energy routing system with six power converter modules having 1-4 multiplexers to realize dynamic second ports with various capacities, in accordance with an exemplary embodiment of the present disclosure.

Additional "static" AC and/or DC ports can be accommodated to further enhance the flexibility and value of the MERS. For instance, it can be increasingly desirable that the load be served from a renewable source, such as PV, or that peak demand on the grid be managed using energy storage. This would typically require additional converters for the PV panels and the batteries, with further integration needed with the charging portals, as shown in FIG. 2 and FIG. 3. The MERS can achieve the full functionality of an integrated grid-connected system including PV, energy storage, the DC loads (e.g. EV charging), and AC loads/sources, allowing advanced functions such as demand reduction, grid support, bidirectional power flow (AC and DC) between all ports, thus unlocking additional value streams without adding significant cost or sacrificing flexibility. This is possible, with full isolation from the dynamic ports and the grid, because of the integrated line frequency step-down transformer, using the same converter modules as shown in FIGS. 5A-B. For this "static" port, multiplexing may not be required and the appropriate number of converter modules can be permanently connected in parallel to meet the power level required, as shown in an exemplary implementation of the MERS in FIG. 6. The addition of these sources is possible leveraging the same converters, without the need for separate power electronics as required in conventional solutions. The MERS can also accommodate a generator or fuel cell if such a source needs to be integrated, in a floating configuration, as shown in FIGS. 5A-B. The ability for the MERS to have double isolation, one from the step-down transformer and another from the power converter transformers within the converter modules can provide unique configurability for loads and sources that may need grounding or safety grounds. Further, as each converter module can have its own isolation, even as "output" ports are configured (see FIG. 6), they all can retain galvanic isolation from each other. This allows the MERS to feed multiple loads (e.g. EVs or hydrogen electrolysis cells) while providing independent safety grounding for each load. This flexibility is important in realizing a wide range of potential applications that the MERS can support in the field over a life of many years.

Figure 7:
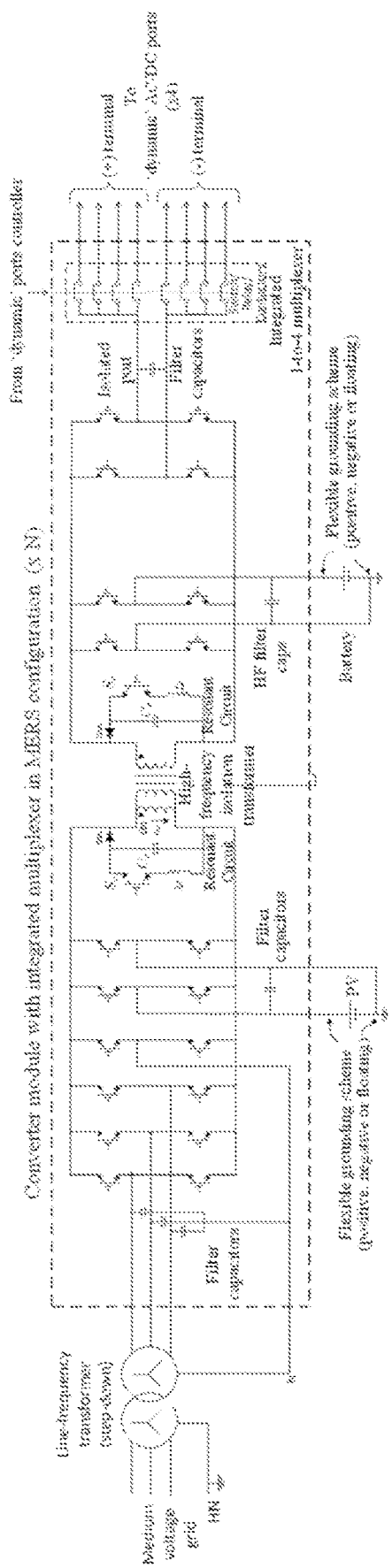
FIG. 7 provides a schematic illustrating potential grounding schemes for sources and loads enabled by a multiport energy routing system, in accordance with an exemplary embodiment of the present disclosure.
Figure 8:
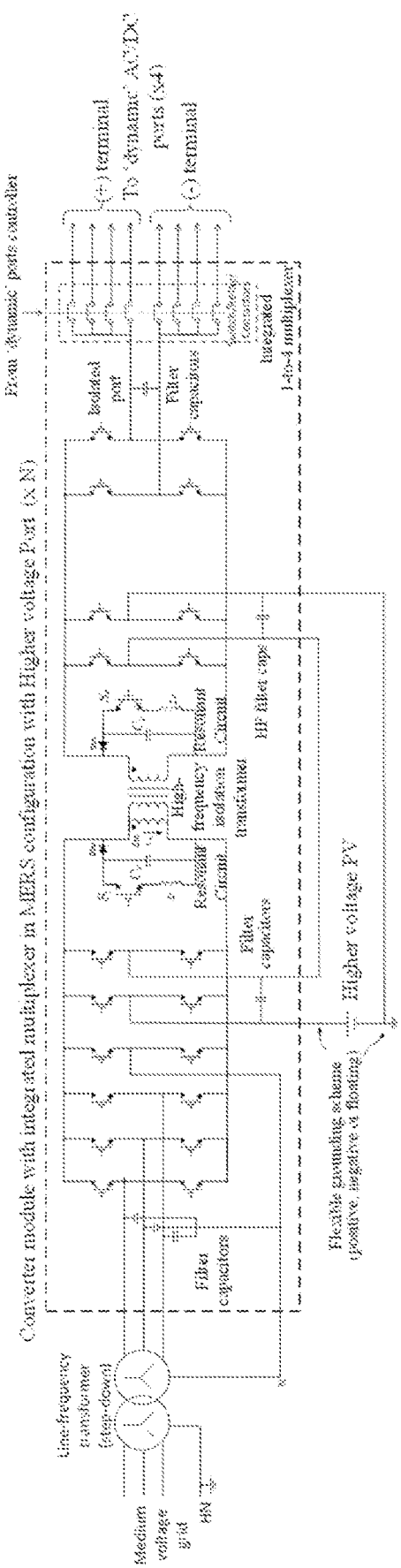
FIG. 8 provides a schematic of a multiport energy routing system to interface with higher AC/DC voltage system through series connection of two static ports with definable grounding points, in accordance with an exemplary embodiment of the present disclosure.

The double isolation offered by the MERS also allows for flexible grounding schemes of the sources and loads. Indeed, as shown in FIG. 7, in addition to the first port and plurality of second ports, the MERS can further include additional static and/or dynamic ports electrically coupled to one or more of the first converter bridges or one or more of the second converter bridges. For example, as shown in FIG. 7, the MERS can further comprise a third port (e.g., a static port) electrically coupled to a PV array and to one or more of the first converter bridges of the plurality of power converter modules. The MERS can further comprise a fourth port (e.g., a static port) electrically coupled to a battery and one or more of the second converter bridges of the plurality of power converter modules. As also shown in FIG. 7, the MERS can be configured to independently define a positive or negative DC ground for a PV array and a battery storage system. The static DC ports can also be left floating if desired. In addition, the double isolation enables the "series" connection of two static ports, across the power converter transformer, to double the voltage capability of the port. This can be used to interface with higher voltage PV system, for example in the 1.5 kV to 2 kV range, as shown in FIG. 8.

A MERS built with N converter modules, each having dedicated/individual electrical isolation can accommodate up to N+1 grounding schemes, wherein the ground on the first converter bridges can be defined freely/flexibly using the isolation provided by the grid transformer, and the ground on the second converter bridges can be defined independently N times, at the individual converter module level.

Finally, the converter modules employed in the various embodiments disclosed herein can be fully bi-directional, and AC or DC power can flow from any port to any other port, as well as to and from the grid. This is of great interest for vehicle-to-grid (V2G) applications and to provide grid-support and microgrid functionalities.

To further illustrate the unique level of flexibility offered by the various MERS disclosed herein, four use cases considering an exemplary MERS used in a fast-charging application are shown in FIG. 9A-D. The MERS considered uses a configuration similar to that of FIG. 6 and has 900A of capacity to be shared between the dynamic ports. It is further assumed that six vehicles are connected to six of the dynamic ports in these use cases. Out of the six vehicles, five vehicles are electric cars (or EVs) capable of various charging rates and requiring different DC or AC charging voltages, for example from 350 Vdc to 850 Vdc, and 208 Vac, and one vehicle is an electric truck with the highest power and voltage requirement in this example, for instance 1000 Vdc. It is important to note that the four use cases presented in this example can use the exact same MERS platform and hardware.

Figure 9A:
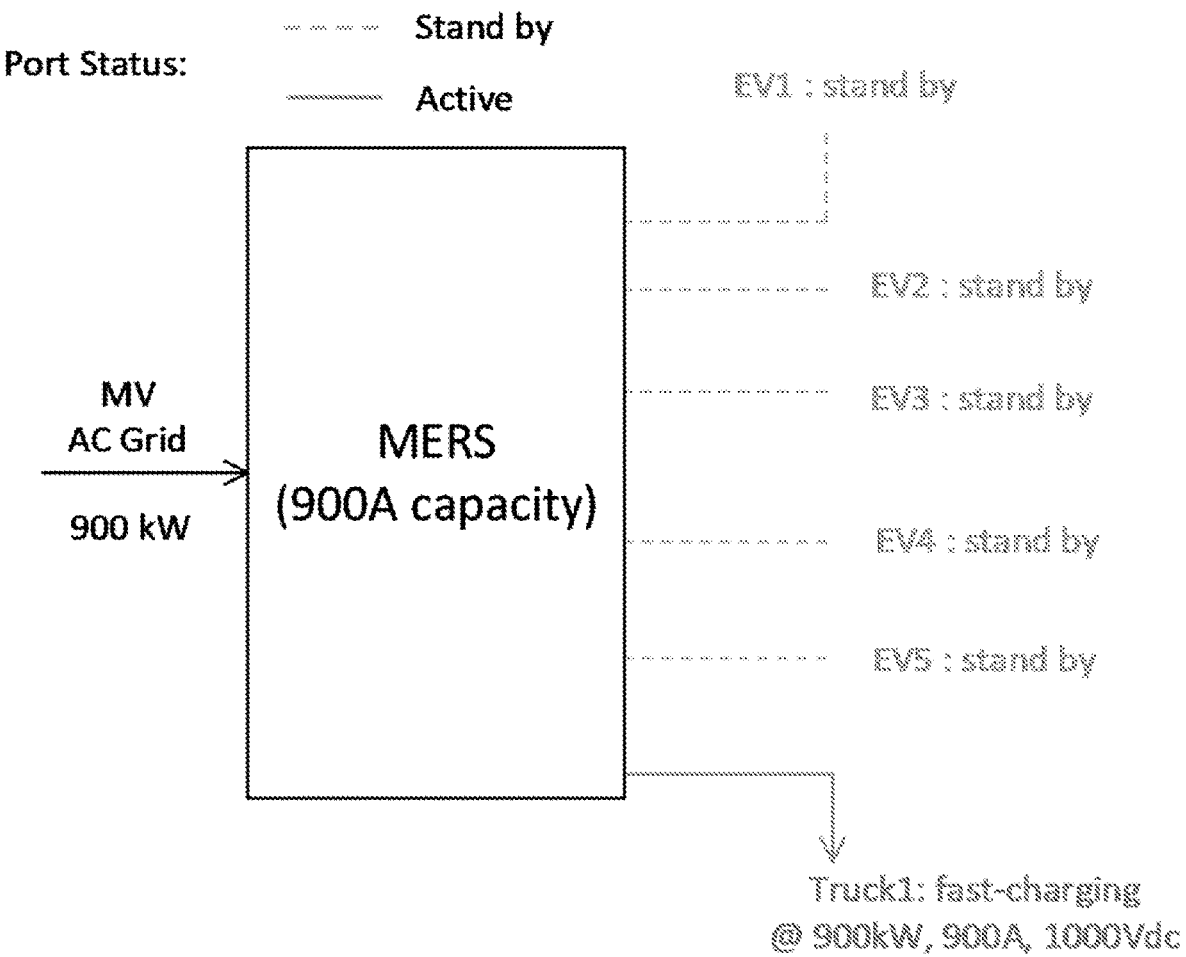
FIGS. 9A-D provides four use cases for a 900A multiport energy routing system, in accordance with an exemplary embodiment of the present disclosure.
Figure 9B:
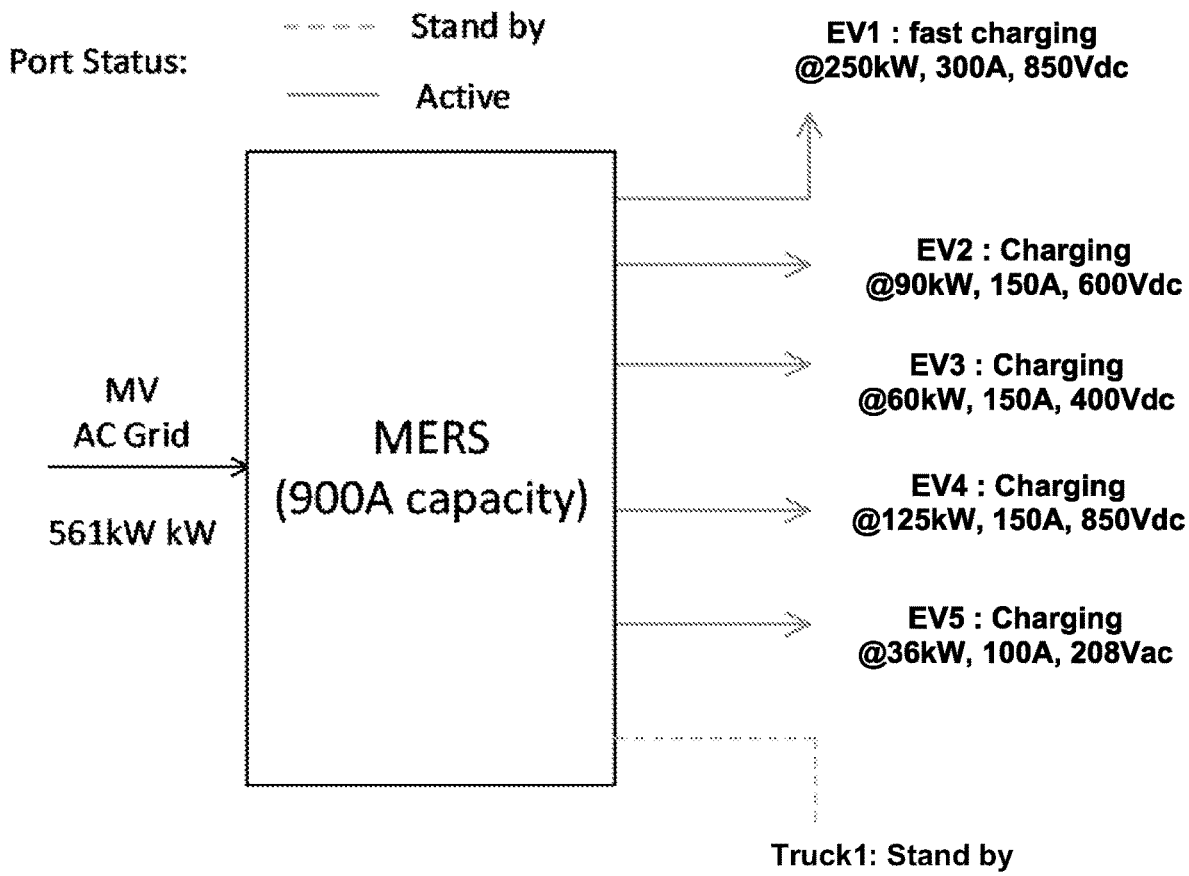
Figure 9C:
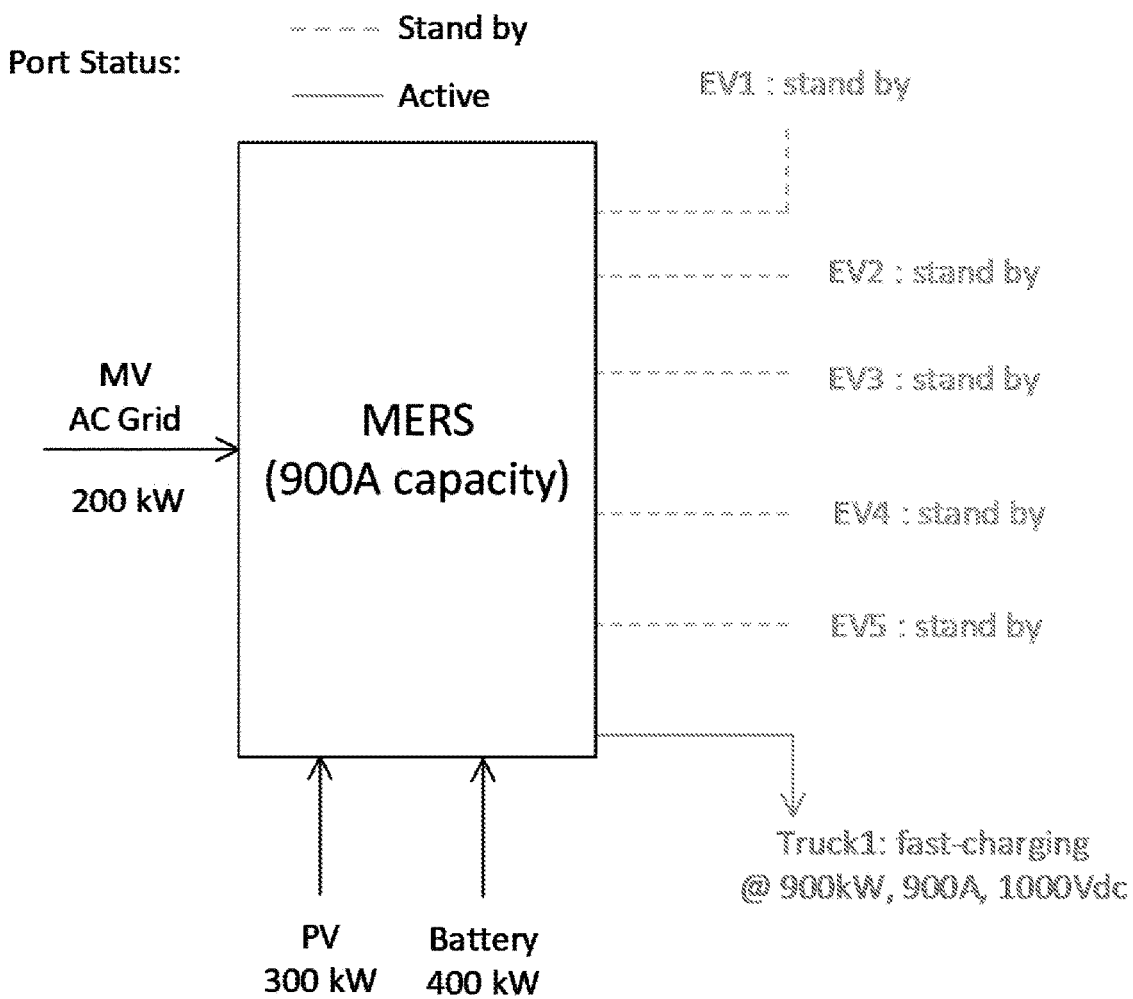

As shown in FIG. 9A, Case I, the full capacity of the MERS can be dedicated to charging the electric tuck, with 900A of DC current at 1000 Vdc giving 900 kW of charging capacity. In this case, the other ports are in "stand-by" mode and the MV AC grid is sourcing the full 900 kW of power required. Once the truck is fully charged, or following some higher-level power dispatching control strategy, the truck charging DC port can be disabled and the 900A of current capacity can be dynamically routed to the five other dynamic ports in use, as shown in FIG. 9B, Case II. This is uniquely possible using the multiplexer and dynamic port principles described above. It should be noted that in this example the MERS provides both AC and DC power through the multiple dynamic ports. In FIG. 9B, Case II, each port is controlled independently to fulfill the power and voltage requirement of each vehicle. Once again, the MV grid alone is providing the required power, 561 kW in this case. It should be noted that case I and case II are presented as two discrete exemplary cases, yet all combinations of power distribution between the six vehicles are also possible, i.e., the truck and cars can be charged at the same time with different charging rates, within the MERS capabilities.

Figure 9D:
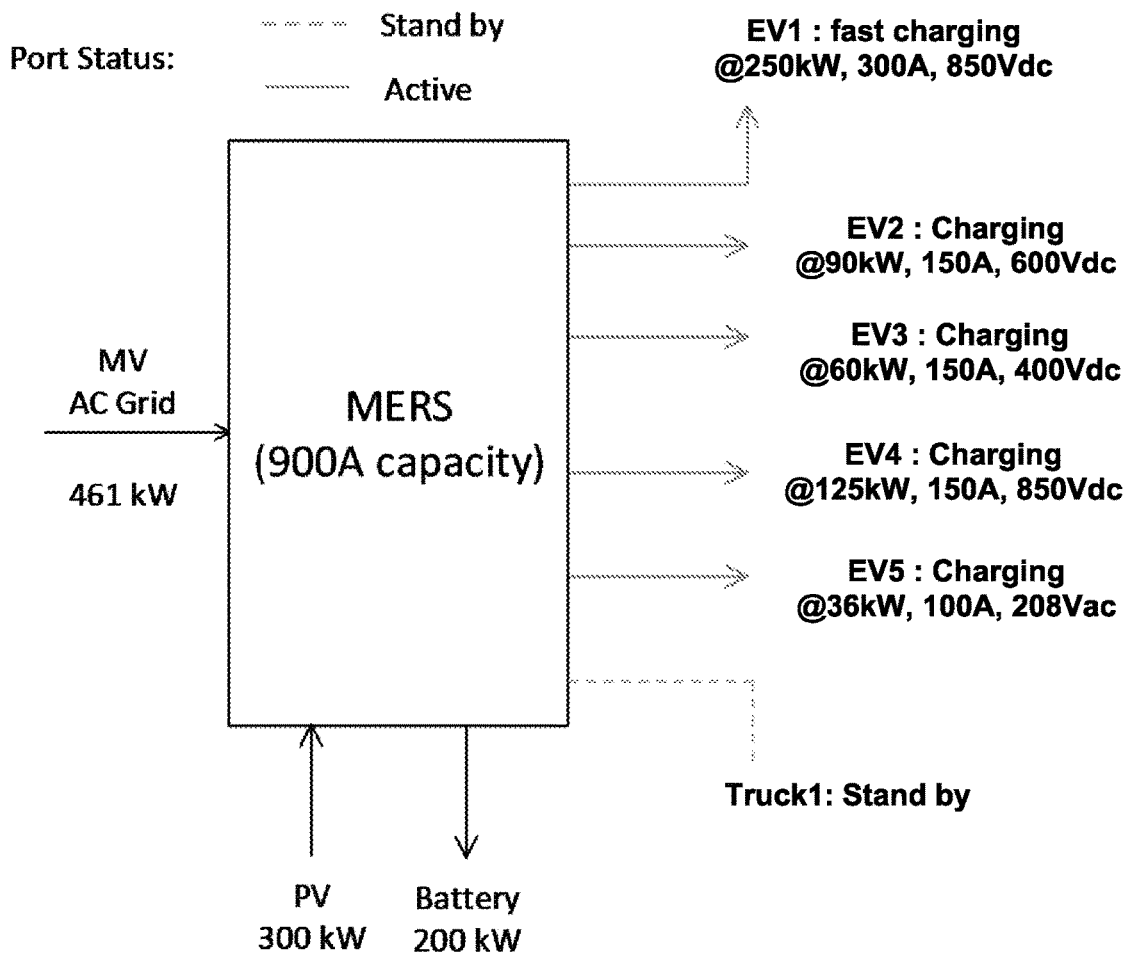
Figure 10:
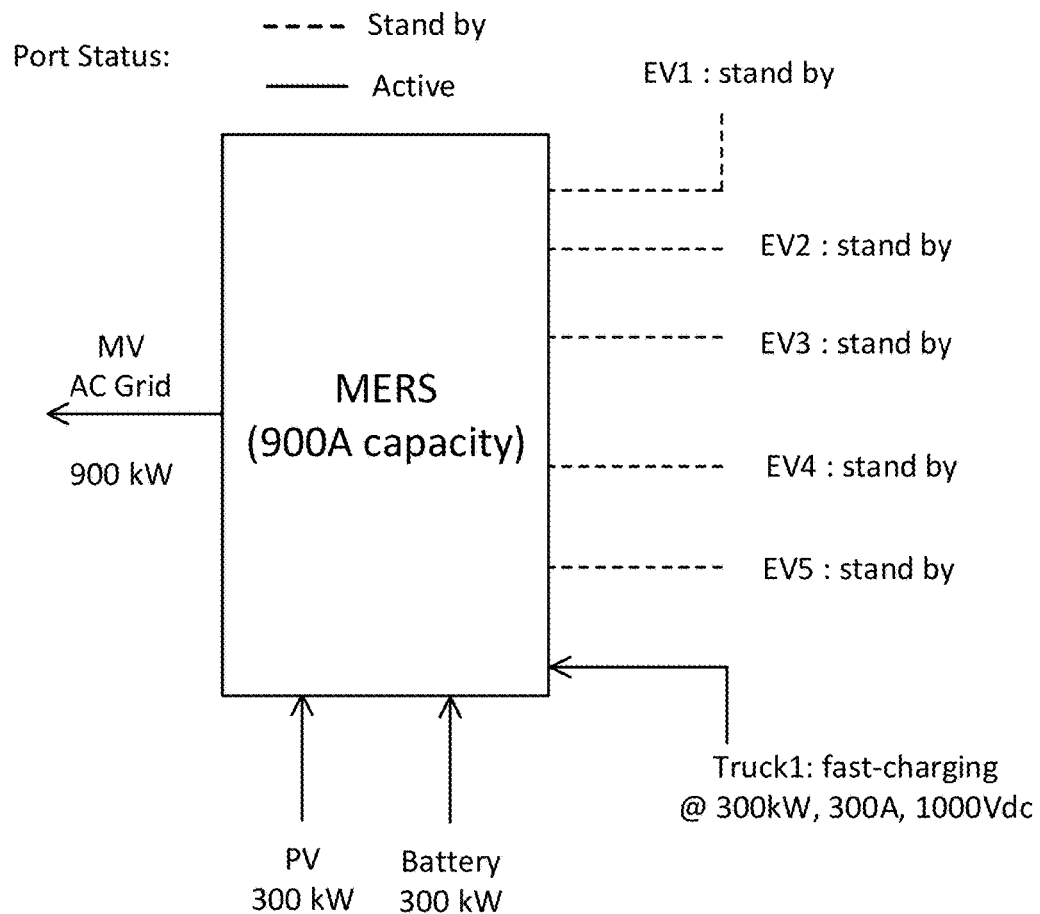
FIG. 10 provides a multiport energy routing system use case showing grid forming operation from PV and battery sources with vehicle-to-grid functionality, in accordance with an exemplary embodiment of the present disclosure.

Case III (FIG. 9C) and Case IV (FIG. 9D) make use of the additional static ports offered by the MERS to also connect a PV source and a battery storage element to the system, once again using the exact same MERS platform and hardware. The static ports could also be used to connect a AC generator if needed by the application. Case III is analogous to case I with the whole dynamic port capacity of the MERS dedicated to charging the truck. However, 700 kW of the required power is now provided in part by the additionally connected PV (300 kW) and battery system (400 kW). This provides a significant level of grid-support, with the power demand on the grid reduced to 200 kW, from the original 900 kW. This additional level of functionality would have required a complete redesign of the converter system using existing conventional approaches, yet is intrinsically offered by the MERS architecture where the additional static ports offered can be leveraged for such application, during the initial system commissioning or at a later time through a field-upgrade campaign. Case IV, FIG. 9D, shows similar charging capacity as in case II, with the addition of the PV and battery system. In this case, 300 kW of power from the PV system and 461 kW of power from the MV grid are merged to provide the required 561 kW of power to charge the vehicles and charge the battery system with the remaining 200 kW.

The four exemplary use cases presented in FIG. 9A-D showcase the unique level of flexibility enabled by the MERS, where power can be routed between any port and any other port, multiple static ports can be used to add distributed energy sources and storage to the system (AC or DC), and the dynamic ports can be controlled independently and reconfigured dynamically to accommodate the target voltage and power levels.

Finally, all the MERS ports can be fully bi-directional and the MERS can also operate in grid-forming mode, with black start and microgrid support if needed. Case V, FIG. shows a typical MERS use case where power is drawn from the PV system (300 kW) and the battery system (300 kW) to inject power back into the grid. Vehicle-to-grid (V2G) support is also possible and leveraged in case V, where the truck battery provides an additional 300 kW of power, for a total injection of 900 kW into the AC grid. This is again possible using the same MERS platform and hardware as in cases I-IV.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A multiport energy routing system comprising:
   device ports configured to be electrically coupled to devices and configured to control power flow between the multiport energy routing system and the devices;
   a step-down transformer having:
      a high voltage side configured to be electrically coupled to an AC utility grid; and
      a low voltage side;
   a power converter stack comprising:
      power converter modules; and
      one or more multiplexers;
      wherein each power converter module comprises:
         a first converter bridge electrically coupled to the low voltage side of the step-down transformer;
         a second converter bridge electrically coupled to the device ports; and
         a power converter transformer having:
            a first side electrically coupled to the first converter bridge; and
            a second side electrically coupled to the second converter bridge;
      wherein at least one of:

at least one of the one or more multiplexers is configured to receive power from at least one of the second converter bridges and deliver power to one or more of the devices; or the first and second converter bridges of at least one of the power converter modules are configured to bidirectionally manage AC and DC power flows between the device ports, simultaneously.

2. The multiport energy routing system of claim 1, wherein a first port of the device ports is a high voltage AC port.

3. The multiport energy routing system of claim 2, wherein:

one or more second ports of the device ports are configured to allow power to flow between the multiport energy routing system and one or more devices electrically coupled to the multiport energy routing system; and a third port of the device ports is:
electrically coupled to the first converter bridge of one or more of the power converter modules; and
configured to allow electrical power to be transferred between:
an AC/DC source/load electrically coupled to the third port; and
another AC/DC source/load electrically coupled to another device port of the multiport energy system.

4. The multiport energy routing system of claim 1, wherein the power converter modules are configured for AC/DC conversion with galvanic isolation.

5. The multiport energy routing system of claim 1, wherein:

a first port of the device ports is configured to be electrically coupled to an AC utility grid;

one or more second ports of the device ports are configured to allow power to flow between the multiport energy routing system and one or more devices electrically coupled to the multiport energy routing system;

the second converter bridge of each power converter module is electrically coupled to one or more of the second ports;

a third port of the device ports is electrically coupled to one of one or more of the first converter bridges or one or more of the second converter bridges;

the third port is configured to allow electrical power to be transferred between an AC/DC source/load electrically coupled to the third port and another AC/DC source/load electrically coupled to another device port of the multiport energy system.

6. The multiport energy routing system of claim 3 further comprising a fourth port of the device ports electrically coupled to the second bridge of one or more of the power converter modules;

wherein the fourth port is configured to allow electrical power to be transferred between an AC/DC source/load electrically coupled to the fourth port and another AC/DC source/load electrically coupled to another of the device ports of the multiport energy system.

7. The multiport energy routing system of claim 6, wherein the fourth port is a dynamic port.

8. The multiport energy routing system of claim 6, wherein a ground of the fourth port is electrically independent of a ground of the first port.

9. The multiport energy routing system of claim 3, wherein one or more of the second ports is a dynamic port configured to:

deliver AC or DC electrical power to; and/or
receive AC or DC electrical power from;
the devices.

10. The multiport energy routing system of claim 3, wherein at least one of:

one or more of the second ports are configured to allow electrical power to flow between the multiport energy routing system and a first device of the devices at a first maximum electrical power level and to allow electrical power to flow between the multiport energy routing system and a second device of the devices at a second maximum electrical power level greater than the first maximum electrical power level;

each power converter module is a soft-switching solid-state transformer converter;

one or more of the devices comprise an electric vehicle charging station;

one or more of the devices comprise a photovoltaic module;

one or more of the devices comprise a battery;

one or more of the devices comprise an electrolyzer; or one or more of the devices comprise a datacenter.

11. The multiport energy routing system of claim 3, wherein each of the first port, the second ports, the third port, and the power converter stack are integrated in a housing.

12. The multiport energy routing system of claim 3 further comprising a controller configured to select one or more of the devices electrically coupled to the second ports to which electrical energy from the multiport energy routing system will be delivered at a predetermined time and maximum power flow capacity.

13. The multiport energy routing system of claim 1, wherein:

the multiport energy routing system provides N+1 independent grounding schemes; and N is the number of power converter modules in the power converter stack.

14. The multiport energy routing system of claim 1 further comprising a static AC port configured to be electrically coupled to an AC utility grid;

wherein the high voltage side of the step-down transformer is electrically coupled to the static AC port.

15. The multiport energy routing system of claim 1, wherein each device port is a dynamic DC port; and wherein each of the multiplexers is configured to be able to:
receive electrical DC power from the second converter bridges of the power converter modules and deliver DC power to one or more of the devices electrically coupled to the dynamic DC ports; and
receive electrical DC power from one or more of the devices electrically coupled to the dynamic DC ports and deliver DC power to the second converter bridges of the power converters modules.

16. The multiport energy routing system of claim 3, wherein;

the multiport energy routing system provides N+1 independent grounding schemes; and N is the number of power converter modules in the power converter stack.

17. The multiport energy routing system of claim 1, wherein the power converter stack further comprises at least one switch and/or relay configured to route power between one or more of the second converter bridges and a predetermined set of the devices.

18. The multiport energy routing system of claim 5 further comprising a fourth port electrically coupled to the second bridge of one or more of the power converter modules;
  wherein the fourth port is at least one of:
    configured to allow electrical power to be transferred between an AC/DC source/load electrically coupled to the fourth port and another AC/DC source/load electrically coupled to another of the ports of the multiport energy system; or
    a dynamic port.

19. The multiport energy routing system of claim 5, wherein one or more of the second ports is a dynamic port configured to:
  deliver AC or DC electrical power to; and/or
  receive AC or DC electrical power from;
  the devices.

20. The multiport energy routing system of claim 5, wherein:
  the multiport energy routing system provides N+1 independent grounding schemes; and
  N is the number of power converter modules in the power converter stack.

* * * * *